(12) United States Patent
Liu

(10) Patent No.: US 11,086,152 B2
(45) Date of Patent: Aug. 10, 2021

(54) GLASS SHIELDING FILM AND VEHICLE-MOUNTED PROTECTING FILM SYSTEM

(71) Applicant: WING TAK LEE SILICONE RUBBER TECHNOLOGY (SHENZHEN) CO., LTD, Guangdong (CN)

(72) Inventor: Tak Nam Liu, Guangdong (CN)

(73) Assignee: WING TAK LEE SILICONE RUBBER TECHNOLOGY (SHENZHEN) CO., LTD, Shenzhen (CN)

( * ) Notice: Subject to any disclaimer, the term of this patent is extended or adjusted under 35 U.S.C. 154(b) by 38 days.

(21) Appl. No.: 16/509,485

(22) Filed: Jul. 11, 2019

(65) Prior Publication Data

US 2020/0341311 A1    Oct. 29, 2020

(30) Foreign Application Priority Data

Apr. 26, 2019  (CN) .......................... 201910345479.5

(51) Int. Cl.
| G02F 1/133 | (2006.01) |
| G02F 1/1334 | (2006.01) |
| B32B 7/023 | (2019.01) |
| B32B 17/10 | (2006.01) |
| B60J 3/04 | (2006.01) |

(52) U.S. Cl.
CPC .......... *G02F 1/13306* (2013.01); *B32B 7/023* (2019.01); *B32B 17/10504* (2013.01); *B60J 3/04* (2013.01); *G02F 1/1334* (2013.01); *B32B 2605/006* (2013.01)

(58) Field of Classification Search
CPC . G02F 1/1334; B32B 7/023; B32B 17/10504; B32B 2605/006; B60J 3/04
See application file for complete search history.

(56) References Cited

U.S. PATENT DOCUMENTS

2015/0331296 A1* 11/2015 Mennig .................... B32B 37/12
                                                   359/296
2020/0081284 A1*  3/2020 Melcher ..................... B60J 3/06

FOREIGN PATENT DOCUMENTS

EP            2966496 A4 * 10/2016   ....... B32B 17/10504

* cited by examiner

*Primary Examiner* — Jessica M Merlin

(57) ABSTRACT

The present application provides a glass shielding film, wherein the glass shielding film comprises a protecting film, an intelligent film and a control circuit, the control circuit is used for controlling the intelligent film to be in a transparent state or in a non-transparent state, the intelligent film is used for converting the transparent state or a non-transparent state according to a signal of the control circuit; the intelligent film comprises a front conducting layer, a rear conducting layer and a middle component; the front conducing layer is disposed on the front surface of the middle component; the rear conducting layer is disposed on the rear surface of the middle component; the protecting film is adhered and fixed to the outer side surface of the front conducting layer, the outer side surface of the rear conducting layer is adhered to the rear surface of glass.

1 Claim, 3 Drawing Sheets

GLASS SHIELDING FILM AND VEHICLE-MOUNTED PROTECTING FILM SYSTEM

CROSS-REFERENCE TO RELATED APPLICATION

The present application is based upon and claims priority to Chinese patent application No. 201910345479.5, filed on Apr. 26, 2019, the entire content of which is incorporated herein by reference.

TECHNICAL FIELD

The present application relates to the field of vehicle accessories, and particularly relates to a novel glass shielding film and a vehicle-mounted protecting film system.

BACKGROUND

An auto film is a layer of film-like object adhered to front and rear windscreens, side window glass and skylight of a vehicle, and this layer of film-like object is also called a solar film, or a heat-insulating film. It mainly takes effects of resisting ultraviolet ray, obstructing partial heat, preventing glass from hurting people due to splattering, and resisting dazzling and other situations, and meanwhile achieving a purpose of protecting personal privacy according to the one-way perspective property of the solar film. In addition, it also can reduce damage of articles and persons in the vehicle caused by ultraviolet irradiation, the temperature in the vehicle is decreased through physical light reflection, and the use of automobile air conditioner is reduced, thereby reducing oil consumption and saving a part of expenses.

The automobile, as a private article, has a privacy requirement, and thus has some one-way perspective films, however, although the one-way perspective film can protect privacy, the transmittance of its one-way translucency is not high, so that people in the vehicle cannot clearly see views outside the window. Thus, there is a need for a film capable of not only protecting privacy but also ensuring translucency, thereby influencing the experience of a user.

SUMMARY

An embodiment of the present application provides a novel glass shielding film and a vehicle-mounted protecting film system so as to achieve two protections with respect to translucency and privacy, thereby improving the experience of a user.

The first embodiment of the present application provides a novel glass shielding film, wherein the novel glass shielding film includes a protecting film, an intelligent film and a control circuit, wherein, the control circuit is used for controlling the intelligent film to be in a transparent state or in a non-transparent state, the intelligent film is used for converting the transparent state or the non-transparent state according to a signal of the control circuit;

the intelligent film includes a front conducting layer, a rear conducting layer and a middle component; the front conducing layer is disposed on the front surface of the middle component; the rear conducting layer is disposed on the rear surface of the middle component; the protecting film is adhered and fixed to the outer side surface of the front conducting layer, and the outer side surface of the rear conducting layer is adhered to the rear surface of glass; the middle component is a component having molecules ordering arrangement in an electric field and having molecules disordering arrangement without the electric field.

The second embodiment of the present application provides a vehicle-mounted protecting film system, which includes a plurality of vehicle-mounted protecting films. The vehicle-mounted protecting film includes a protecting film, an intelligent film and a control system; the control system includes a power source and an electric device, and the intelligent film includes a front conducting layer, a rear conducting layer and a middle component; the front conducting layer is disposed on the front surface of the middle component, and the rear conducting layer is disposed on the rear surface of the middle component; the protecting film is adhered and fixed to the outer side surface of the front conducting layer, the outer side surface of the rear conducting layer is adhered to the rear surface of glass; the middle component is a component having molecules ordering arrangement in an electric field and having molecules disordering arrangement without the electric field, the electric device is respectively connected with the front conducting layers and the rear conducting layers of the plurality of vehicle-mounted protecting films, the power source supplies the electric device, and the plurality of vehicle-mounted protecting films are disposed on the rear surface of vehicle window glass.

The implementation of embodiment of the present application has the following beneficial effects:

it can be seen that the present application provides a novel glass shielding film which includes a front transparent body, a protecting film, an intelligent film and a control circuit, the intelligent film can be a transparent film after being electrified and a non-transparent film after being not electrified, in such a way, whether the glass is transparent or not is determined depending on user's preference. Application of the intelligent film to a vehicle can achieve adjustment of transparency. An experiment proves that the above intelligent film has the transparency of more than 85% under the diaphanous condition, and thus has the advantage of improving the experience of a user.

BRIEF DESCRIPTION OF THE DRAWINGS

For more clearly describing the technical solution in the embodiment of the present application, drawings used in the description of the embodiment will be simply described below, apparently, the drawings in the following description are some embodiments of the present application, and those of ordinary skill in the art can also obtain other drawings according to these drawings without creative efforts.

DESCRIPTION OF THE EMBODIMENTS

The technical solution in an embodiment of the present application will be clearly and completely described in combination with drawings in the embodiment of the present application, apparently, the embodiments in the following description are parts of embodiments of the present application, but not all the embodiments. Based on the embodiment of the present application, other embodiments obtained by those of ordinary skill in the art without creative efforts all fall within the protective scope of the present application.

Terms "first", "second", "third" and "fourth" or the like used in the specification and claims as well as the drawings of the present application are intended to distinguish different objects, but not describe a specific sequence. Furthermore, terms "including" and "having" as well as any transformations thereof are intended to cover non-exclusive comprising. For example, processes, methods, systems, products or devices comprising a series of steps or units are not limited to steps or units that have been listed, and optionally include steps or units that have not been listed, or optionally also include other steps or units that are inherent to these processes, methods, products or devices.

"Embodiment" mentioned herein means that specific features, structures or properties described in combination with the embodiment can be contained in at least one embodiment of the present application. Embodiments where this phrase occurs at various locations of the specification do not necessarily refer to the same embodiments, and are not independent or alternative embodiments mutually exclusive one another. It is explicitly and implicitly understood for those skilled in the art that embodiments described herein can be combined with other embodiments.

Figure 1:
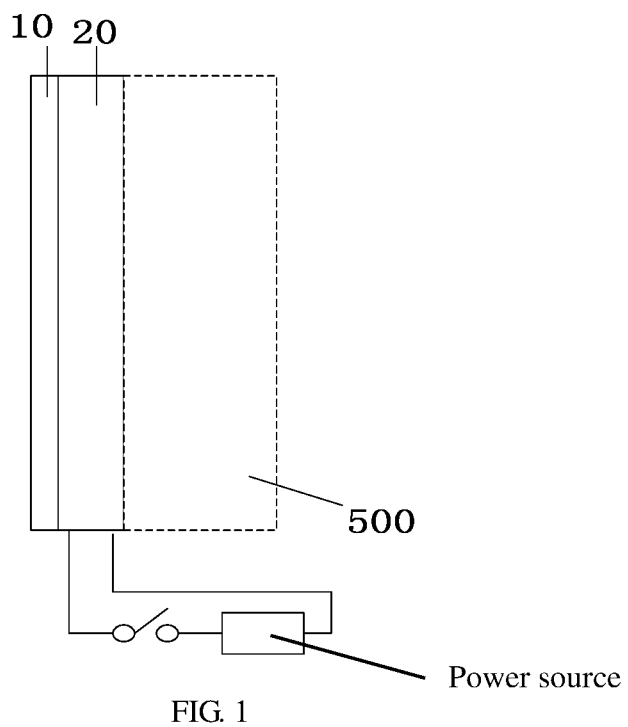
FIG. 1 is a structural diagram of a novel glass shielding film according to an embodiment of the present application.

Referring to FIG. 1, FIG. 1 is a novel glass shielding film. As shown in FIG. 1, the novel glass shielding film comprises a protecting film 10, an intelligent film 20 and a control circuit, wherein the control circuit is used for controlling the intelligent film 20 to be in a transparent state or in a non-transparent state, the intelligent film 20 is used for converting the transparent state or a non-transparent state according to a signal of the control circuit.

The present application provides a novel glass shielding film, wherein the novel glass shielding film includes a front transparent body 50, the protecting film 10, an intelligent film 20 and a control circuit, the intelligent film 20 may be a transparent film after being electrified and a non-transparent film after being not electrified, in such a way, whether the glass is transparent or not is determined depending on user's preference. Application of the intelligent film to a vehicle can achieve adjustment of transparency. An experiment proves that the above intelligent film has a transmittance of more than 85% under the diaphanous condition, and thus has the advantage of improving the experience of a user.

Figure 2:
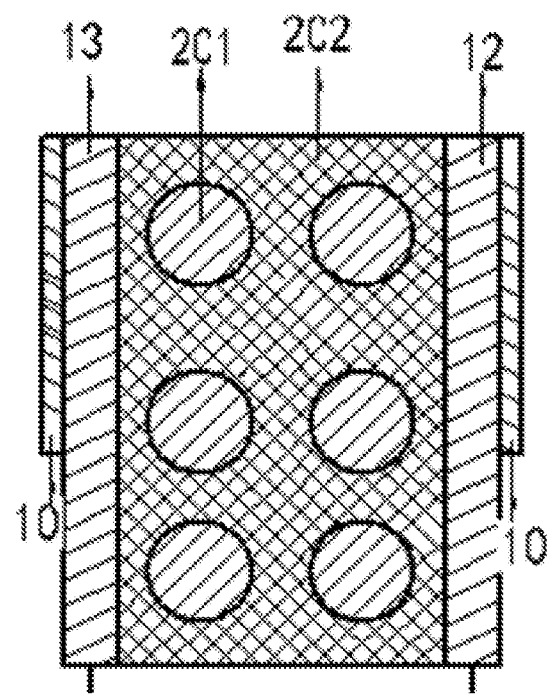
FIG. 2 is a structural diagram of an intelligent film according to the embodiment of the present application.

Preferably, the above intelligent film 20, as shown in FIG. 2, includes a front conducting layer 12, a rear conducting layer 13 and a middle component 20; the front conducing layer 12 is disposed (for example, electroplating or hot press) on the front surface of the middle component; the rear conducting layer 13 is disposed on the rear surface of the middle component 20; the protecting film 10 is adhered and fixed to the outer side surface of the front conducting layer 12, the outer side surface of the rear conducting layer 13 is adhered to the rear surface (one surface of the glass close to the inside of the vehicle is the rear surface) of glass 500; the middle component is a component having molecules ordering arrangement in an electronic field and having molecules disordering arrangement without the electronic field, for example, liquid crystal material.

It is noted that the above disposed front conducting layer or rear conducting layer may specifically be a conducting clad layer or conducting hot press layer, and the protecting film layer on the rear surface is canceled. After the protecting film on the rear surface is removed, the novel glass shielding film has a thickness of less than 0.1 mm, and thus can be used in the window portion of the vehicle. For the film thickness of the vehicle window, the film thickness of the vehicle window must be less than 0.15 mm, in order not to influence the lifting function of the vehicle window.

The above middle component may be composed of a mixed material of liquid crystal body 201 and a high polymer material filling material 202. The above liquid crystal body may be a liquid crystal display screen material, the above high polymer material may be a light transmitting high polymer material, the above liquid crystal body specifically may be a liquid crystal material having molecules ordering arrangement in an electric field and having molecules disordering arrangement without the electric field, for example, an orientation layer of a liquid crystal display screen.

Figure 2A:
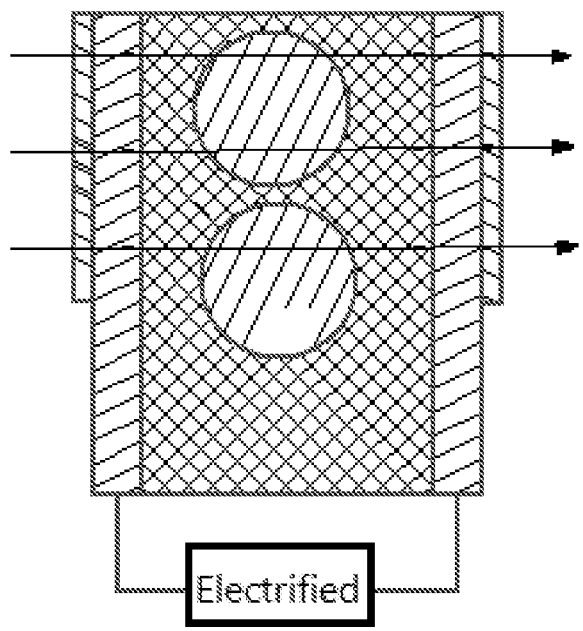
FIG. 2a is an electrified light diagram of an intelligent film according to the embodiment of the present application.
Figure 2B:
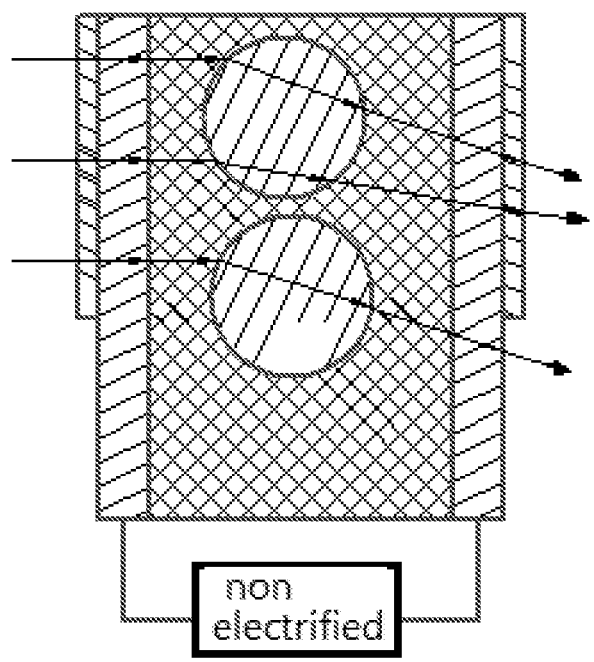
FIG. 2b is a non-electrified light diagram of an intelligent film according to the embodiment of the present application.

Referring to FIG. 2a, FIG. 2a is a light-transmitting diagram of a structure as shown in FIG. 1 of the present application. As shown in FIG. 2b, FIG. 2b is a non-light-transmitting diagram of a structure as shown in FIG. 1 of the present application. As shown in FIG. 2a, if the control circuit 14 is electrified, the molecules of the liquid crystal body are arranged in an ordered form, at this moment, lights directly penetrate through the whole middle component, and the middle component has good translucency; if not being electrified, molecules of the liquid crystal body are arranged in a disordered form, at this moment, lights can be reflected when penetrating through the this liquid crystal body. As shown in FIG. 2b, the lights can be scattered, thereby achieving a light-proof purpose.

The above control circuit may include a power source and a switch, the switch may be a film switch of which one end is connected with the front conducting layer 12 and the other end is connected with a positive electrode of the power source, and a negative electrode of the power source is connected with the rear conducting film 13. The above control circuit may be disposed at any positions of a bag body, the specific position can be voluntarily set by a designer of the novel glass shielding film and the vehicle-mounted protecting film system, and thus the specific position of the control circuit of the present application is not shown in figures.

Figure 3:
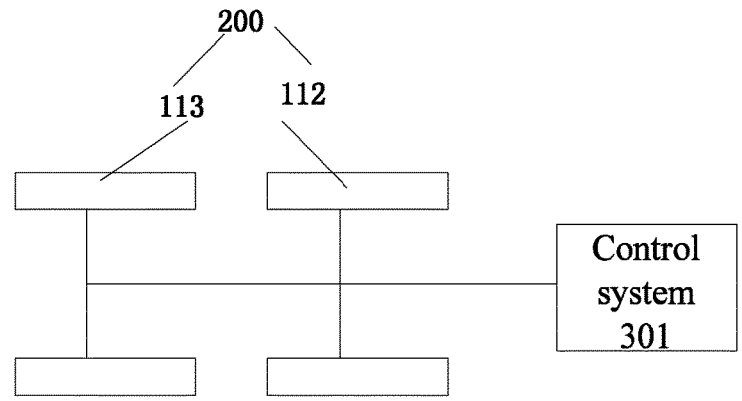
FIG. 3 is a structural diagram of a vehicle-mounted protecting film system according to the embodiment of the present application.

Referring to FIG. 3, FIG. 3 is a structural diagram of a vehicle-mounted protecting film system. As shown in FIG. 3, the vehicle-mounted protecting film system includes a plurality of vehicle-mounted protecting films 200 and a control system 301. The control system 301 includes a power source and an electric device, the electric device is respectively connected with the front conducting layers 12 and the rear conducting layers 13 of the plurality of vehicle-mounted protecting films 200. The powder source supplies electricity to the electric device. The plurality of vehicle-mounted protecting films 200 are disposed on the rear surface of the vehicle window glass (namely, the inside of the vehicle). The vehicle-mounted protecting film includes a protecting film and an intelligent film, the intelligent film includes a front conducting layer, a rear conducting layer and a middle component; the front conducting layer is disposed on the front surface of the middle component, and the rear conducting layer is disposed on the rear surface of the middle component; the protecting film is adhered and fixed to the outer side surface of the front conducting layer, the outer side surface of the rear conducting layer is adhered to the rear surface of the glass; the middle component is a component having molecules ordering arrangement in an electric field and having molecules disordering arrangement without the electric field. The electric device is respectively connected with the front conducting layers and the rear conducting layers of the plurality of vehicle-mounted protecting films. The power source supplies electricity to the electric device. The plurality of vehicle-mounted protecting films are disposed on the rear surface of the vehicle window glass.

The rear disposed according to the technical solution provided by the present application can better protect the vehicle. When in a non-transparent state, the vehicle-mounted protecting film can obstruct lights, in such a way, ultraviolet rays or heat can be prevented; when in a transparent state, the light transmittance of the vehicle-mounted protecting film is up to 85%, and views outside can be observed well.

Figure 4:
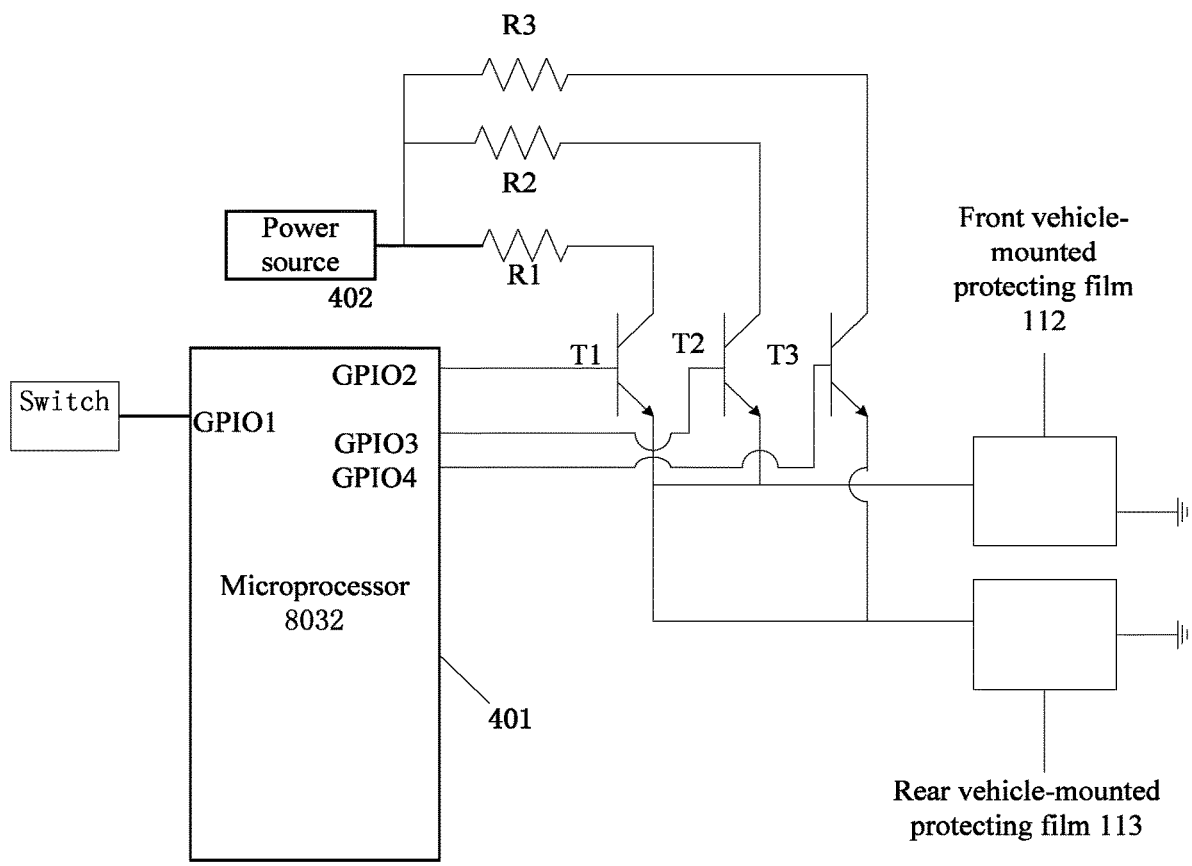
FIG. 4 is a structural diagram of an electric device according to the embodiment of the present application.

As shown in FIG. 4, the electric device includes a microprocessor (for example, MCS51 series singlechips, or other series singlechips), a switch tube and a resistor, wherein, the plurality of vehicle-mounted protecting films 1 include front vehicle-mounted protecting films 112 and rear vehicle-mounted protecting films 113, wherein, the front vehicle-mounted protecting films 112 may be disposed on the rear surface of the vehicle window of the first-row seats of the vehicle, and the rear vehicle-mounted protecting films 113 may be disposed on the rear surface of the vehicle window of the second-row seats of the vehicle;

the general input/output interface (GPIO) of the microprocessor, for example MCS51 series, is specifically P0.0/AD0 or other interfaces, and GPIO1 is connected with the film switch; the power source is respectively connected with one ends of the first resistor R1, the second resistor R2 and the third resistor R3, the other ends of the first resistor R1, the second resistor R2 and the third resistor R3 are respectively connected with collectors of the first audion T1, the second audion T2 and the third audion T3, and bases of the first audion T1, the second audion T2 and the third audion T3 are respectively connected with the GPIO2 (P0.1/AD1), GPIO3 (P0.2/AD2) and GPIO4 (P0.3/AD3) of the microprocessor; emitters of the second audion T2 and the third audion T3 are respectively connected with the front conducting layers of the front vehicle-mounted protecting film 112 and the rear vehicle-mounted protecting film 113, the emitter of the first audion T1 is connected with the front conducting layers of the front vehicle-mounted protecting films 112 and the rear vehicle-mounted protecting films 113; the rear conducting layers of the front vehicle-mounted protecting film 112 and the rear vehicle-mounted protecting film 113 are grounded. The microprocessor is used for acquiring the pressing number of the film switch, and GPIO2 (P0.1/AD1), GPIO3 (P0.2/AD2) and GPIO4 (P0.3/AD3) are controlled to output high level or low level according to this pressing number.

Wherein, the resistance values of the resistor R1, the resistor R2 and the resistor R3 can be adjusted voluntarily according to glass areas of different types of vehicles. The above power source may be a vehicle-mounted power source, for example, a storage battery, and the power source may also output through a cigar lighter interface of the vehicle.

As an example, for example, press is performed once, it is determined that GPIO2 is high level, T1 is conducted, T2 and T3 are switched off, two glass shielding films are both transparent; press is performed twice, it is determined that GPIO3 is high level, T2 is conducted, T1 and T3 are switched off, the front glass shielding film is transparent; press is performed three times, it is determined that GPIO4 is high level, T3 is conducted, T1 and T2 are switched off, the rear glass shielding film is transparent.

It is noted that for the sake of a brief description, the foregoing various method embodiments are described as a series of action combinations, but those skilled in the art should be aware that the present application is not limited by the described action order, as some steps may be performed in other orders or simultaneously according to the present application. Secondly, those skilled in the art should also be aware that the embodiments described in the specification are all optional embodiments and the actions and modules involved are not necessarily required for the present application.

In the above embodiments, the description of each embodiment has its own emphasis, and parts that are not detailed in one embodiment may refer to the relevant descriptions of other embodiments.

In several embodiments provided by the present application, it is understood that the disclosed device can be achieved in other manners. For example, the above described device embodiments are only exemplary, for example, division of the units is only division of logical functions, other division manners may be present when in practical achievement, for example, multiple units or components may be combined or integrated to another system, or some features may be ignored, or not implemented. From another aspect, the displayed or discussed mutual coupling or direct coupling or communication connection may be indirect coupling or communication connection through some interfaces, devices or units, and may be in electrical or other forms.

The units described as separated components may be or may also not be physically separated. The components displayed as display units may be or may also be not physical units, namely, may be located at one place, or may also be distributed to multiple network units. Part or all of the units here may be selected according to a practical need to achieve the purposes of the solutions of the embodiments of the present application.

In addition, various functional units in various embodiments of the present application can be integrated in one processing unit, or various units can be individually physically present, or two or more units can be integrated in one unit. The above integrated units can be achieved in a hardware form, or in a software program module.

When the integrated unit is achieved in a form of the software program module and sold or used as an independent product, it can be memorized in one computer readable memory. Based on this understanding, technical solutions of the present application substantively, or a part thereof making a contribution to the prior art, or all of or parts of this technical solution, may be reflected in the form of a software product stored in a memorizer, including several instructions to enable a computer equipment (e.g., personal computer, server, network facility, etc.) to execute all of or parts of the steps in the methods of respective embodiments of the present application. The memory mentioned above includes: a U disk, a read-only memory (ROM), a random access memory (RAM), a mobile hard disk, a disk or CD, and other media that can store program code.

It can be understood by those skilled in the art that all or parts of the steps in the various methods of the above embodiments can be accomplished by directing the relevant hardware through a program that can be stored in a computer readable memory, which may include: a flash disk, a read-only memory (ROM) and a random access memory (RAM), a disk or CD, etc.

The embodiments of the present application are described in detail above. The principle and implementation of the present application are described with specific examples herein. The description of the above embodiments is only used for helping to understand the method and core ideas of the present application. At the same time, for those of ordinary skill in the art, specific implementations and application scopes can all be varied according to the thought of the present application. In summary, the contents of this specification should not be construed as limiting the present application.

What is claimed is:

1. A vehicle-mounted protecting film system, wherein the vehicle-mounted protecting film system comprises a plurality of vehicle-mounted protecting films, the vehicle-mounted protecting film comprises a protecting film, an intelligent film and a control system; the control system comprises a power source and an electric device, and the intelligent film comprises a front conducting layer, a rear conducting layer and a middle component; the front conducting layer is disposed on the front surface of the middle component, and the rear conducting layer is disposed on the rear surface of the middle component; the protecting film is adhered and fixed to the outer side surface of the front conducting layer, the outer side surface of the rear conducting layer is adhered to the rear surface of glass; the middle component is a component having molecules ordering arrangement in an electric field and having molecules disordering arrangement without the electric field, the electric device is respectively connected with the front conducting layers and the rear conducting layers of the plurality of vehicle-mounted protecting films, the power source supplies the electric device, and the plurality of vehicle-mounted protecting films are disposed on the rear surface of vehicle window glass;

the electric device comprises a microprocessor, a switch tube and a resistor, the plurality of vehicle-mounted protecting films comprise front vehicle-mounted protecting films and rear vehicle-mounted protecting films; a general input/output interface 1(GPIO1) of the microprocessor is connected with a film switch; the power source is respectively connected with one end of each of a first resistor R1, a second resistor R2 and a third resistor R3, the other ends of the first resistor R1, the second resistor R2 and the third resistor R3 are respectively connected with collectors of a first audion T1, a second audion T2 and a third audion T3, and bases of the first audion T1, the second audion T2 and the third audion T3 are respectively connected with a GPIO2, a GPIO3 and a GPIO4 of the microprocessor; emitters of the second audion T2 and the third audion T3 are respectively connected with the front conducting layers of the front vehicle-mounted protecting film and the rear vehicle-mounted protecting film, an emitter of the first audion T1 is connected with the front conducting layers of the front vehicle-mounted protecting films and the rear vehicle-mounted protecting films; the rear conducting layers of the front vehicle-mounted protecting film and the rear vehicle-mounted protecting film are grounded; the microprocessor is used for acquiring a pressing number of the film switch, and GPIO2, GPIO3 and GPIO4 are controlled to output high level or low level according to this pressing number.

* * * * *